United States Patent [19]

Tosaka et al.

[11] Patent Number: 5,012,269
[45] Date of Patent: Apr. 30, 1991

[54] CAMERA

[75] Inventors: Yoichi Tosaka; Shoji Kaihara, both of Kanagawa, Japan

[73] Assignee: Canon Kabushiki Kaisha, Tokyo, Japan

[21] Appl. No.: 375,952

[22] Filed: Jul. 6, 1989

[30] Foreign Application Priority Data

Jul. 6, 1988 [JP] Japan .................................. 63-167967

[51] Int. Cl.⁵ .............................................. G03B 7/00
[52] U.S. Cl. ................................ 354/419; 354/149.11
[58] Field of Search ..................... 354/419, 149.11, 412

[56] References Cited

FOREIGN PATENT DOCUMENTS 61-289332  12/1986  Japan ............................... 354/149.11

*Primary Examiner*—L. T. Hix
*Assistant Examiner*—David M. Gray
*Attorney, Agent, or Firm*—Fitzpatrick, Cella, Harper & Scinto

[57] ABSTRACT

A camera comprises a flash device which is movable between a pop-up position and a retracted position; a first moving mechanism which moves the flash device from the retracted position to the pop-up position; a charging mechanism which charges a shutter to bring the shutter from a state of having completed photographing into a state of being ready for photographing; and a second moving mechanism which moves the flash device from the pop-up position to the retracted position in association with a charging action of the charging mechanism.

5 Claims, 5 Drawing Sheets

CAMERA

BACKGROUND OF THE INVENTION

1. Field of the Invention

This invention relates to a camera of the kind having a flash device arranged to pop up and down.

2. Description of the Related Art

Mechanisms of varied kinds have heretofore been proposed for popping a flash device up and down by using a motor or the like for automation of camera operations.

For example, Japanese Laid-Open Patent Application No. SHO 62-121428 discloses a method whereby a flash device is arranged to be in a locked state under a force which urges it to pop up and to be unlocked by means of an electromagnet. This method necessitates use of some additional means for moving the flash device down. In accordance with this method, therefore, the photographer is required to manually push the flash device down in most cases. This is a shortcoming of the method in terms of automation of operation of the camera.

Japanese Laid-Open Patent Application Nos. SHO 56-87028, SHO 59-75232 and SHO 61-259238 disclose methods for automatically popping up and down a flash device by means of a motor. In accordance with each of these applications, the flash device is arranged to be moved up and down by the rotation of the motor either in one direction or in two directions.

The cost performance of the methods disclosed by the above-stated Laid-Open Patent Applications Nos. SHO 56-87028, SHO 59-75232 and SHO 61-259238 is hardly satisfactory. The flash device is not always necessary and cannot be used in parallel with other actions such as a shutter charging action, a film winding action, etc., which are to be performed with every operation of the camera. Even if the rotation of the motor in one direction is arranged to be used for the flash device, it is difficult to have all other actions including camera charging, film winding and mirror driving, which is necessary in the case of a single-lens reflex camera, satisfactorily performed using the rotation of the same motor in the other direction. These methods, therefore, require the use of another motor. This presents a problem in terms of simplification of the camera.

SUMMARY OF THE INVENTION

One aspect of this invention lies in the provision of a camera which is capable of popping up and down a flash device with a simple arrangement whereby the flash device is forcedly moved from a pop-up position thereof to a retracted position in association with a shutter charging action.

The above and other aspects and features of the invention will become apparent from the following detailed description of an embodiment thereof taken in connection with the accompanying drawings.

BRIEF DESCRIPTION OF THE DRAWINGS

The accompanying drawings illustrate an embodiment of this invention.

DETAILED DESCRIPTION OF THE PREFERRED EMBODIMENT

Figure 1:
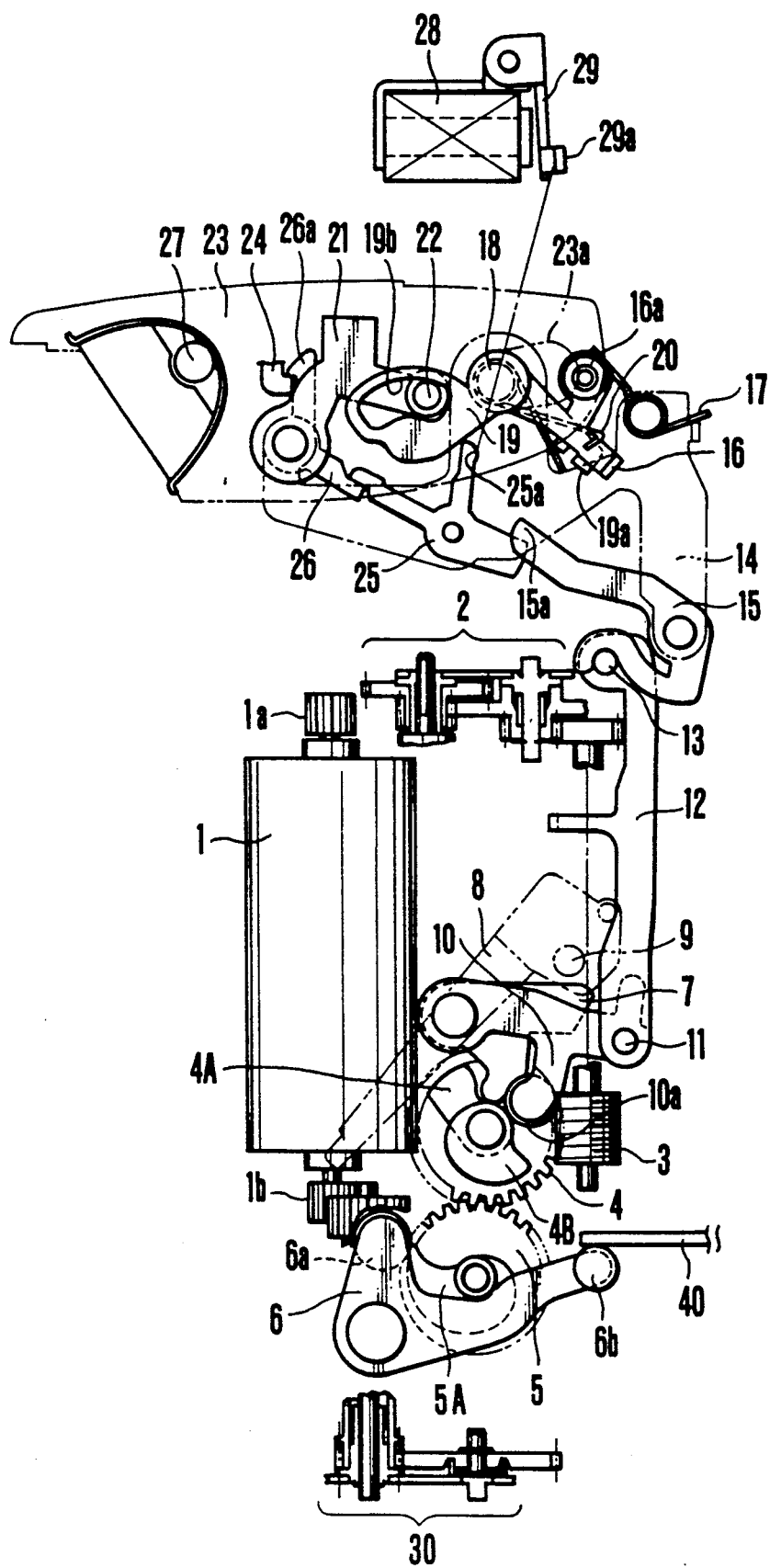
FIG. 1 shows the embodiment as in one operating state.

The figures show a double-axle motor 1; a pinion gear 1a secured to the axle of the motor 1; a gear transmission system 2 which is coupled with the pinion gear 1a and includes planetary gears; and a worm gear 3 coupled with the gear transmission system 2 and transmits only the forward rotation of the motor 1. A cam gear 4 is coupled with the worm gear 3. A cam 4A is provided for driving a mirror. A cam 4B is provided for charging a flash device. A cam gear 5 is provided for charging a shutter. A lever 6 is interlocked with the cam gear 5. A roller part 6a is arranged to trace the cam 5A of the cam gear 5. A lever 7 is arranged to raise the mirror by tracing the above-stated cam 4A.

A reference numeral 8 denotes the mirror. A dowel 9 is secured to the mirror 8 and is arranged to be kicked up by the lever 7 in raising the mirror 8. The figures further show a link 10; a roller 10a which is arranged to trace the cam 4B; a pin 11; a link 12 which is pivotally carried by the pin 11 on the link 10; a dowel 13 which is secured to the fore end of the link 12; a base plate 14; a lever 15 which is rotatably carried by the base plate 14 and is coupled with the link 12 by means of the dowel 13; a lever 16 arranged to be rotatable on a shaft 18 which is carried by the base plate 14; and the roller part 16a of the lever 16 which is urged by a spring 17 to rotate clockwise.

A lever 19 is arranged to be urged by a spring 20 to turn counterclockwise relative to the lever 16. The lever 19 is thus turned by the spring 20 until its bent-up part 19a abuts on the lever 16. A cam hole 19b is formed in the fore end part of the lever 19. A link 21 is arranged to be turnable relative to the base plate 14 and to rotatably carry a roller 22 at its fore end. The roller 22 is arranged to be movable along the inner side face of the cam hole 19b.

A reference numeral 23 denotes a casing. A hook 24 is secured to the casing 23. A lever 25 is rotatably carried by the base plate 14. A clamp lever 26 is carried by the rotation shaft of the link 21 to be rotatable coaxially with the link 21. The fore end part 26a of the clamp lever 26 is arranged to engage the hook 24 and to disengage the hook 24 by turning clockwise when the lever 25 turns counterclockwise. A reference numeral 27 denotes a light emitting part of the flash device. A numeral 28 denotes a magnet. A yoke 29 is arranged to be attracted by the magnet 28 when a current is applied to the latter. With the yoke 29 attracted, a bent-up part 29a of the yoke 29 comes to abut on a part 25a of the lever 25 to cause the latter to turn counterclockwise.

On one side of the motor 1 opposite to the side having the above-stated pinion gear 1a, there is provided another pinion gear 1b. A gear transmission system 30 which includes planetary gears is arranged to transmit only the reverse rotation of the pinion 1b to a film winding mechanism which is not shown.

In the camera incorporating the flash device which is arranged mainly as shown in FIG. 1, the flash device is operated as follows: If flashing by the flash device is decided to be necessary when a shutter release button which is not shown is pushed halfway, a current is applied to the magnet 28 under the condition of FIG. 1. This causes the yoke 29 to be attracted and moved clockwise. Then, the part 25a of the lever 25 is pushed by the bent-up part 29a of the yoke 29 to turn counterclockwise. The clamp lever 26 is turned clockwise. The fore end part 26a of the lever 26 then disengages the hook 24 which is secured to the flash device casing 23.

This allows the lever 16 to be turned clockwise by the urging force of the spring 17 applied via the roller part 16a thereof. The lever 16 then pushes the bent-up part 19a of the lever 19 to cause the lever 19 to turn in the same direction.

The roller 22 rotatably carried by the fore end of the link 21 which is also rotatably carried by the base plate 14 is caused by the turning movement of the lever 19 to trace the cam face of the lever 19. This in turn causes the link 21 to turn counterclockwise.

Figure 2:
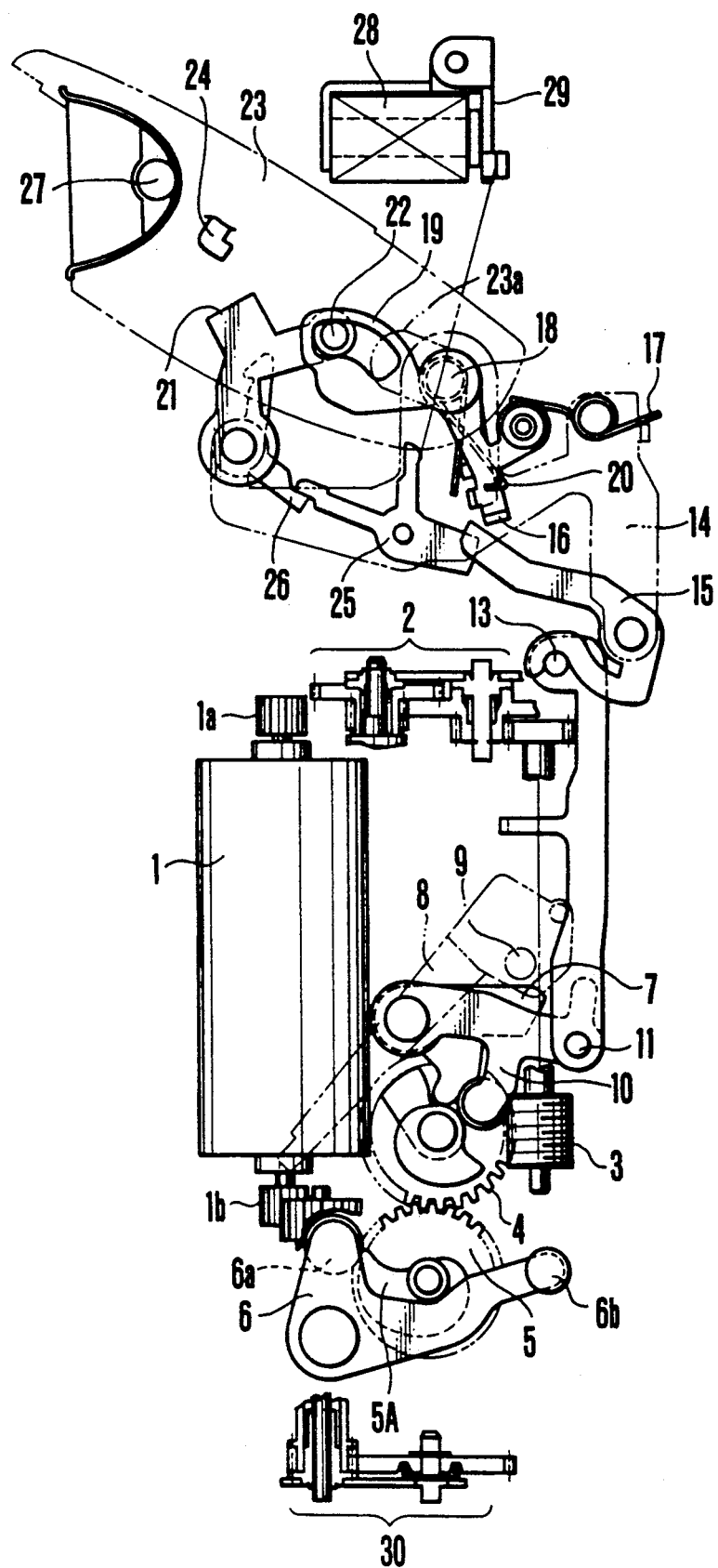
FIG. 2 shows the same as in a state of having completed a flash device rising action.

The casing 23 is rotatably carried by the roller 22 and is raised in the left upward direction by the turning movement of the link 21. The casing 23 has a slot 23a. The left upward movement of the casing 23 comes to a stop when the shaft 18 comes to abut on the right side face of the slot 23a. The upward movement of the flash device thus comes to an end as shown in FIG. 2.

Figure 3:
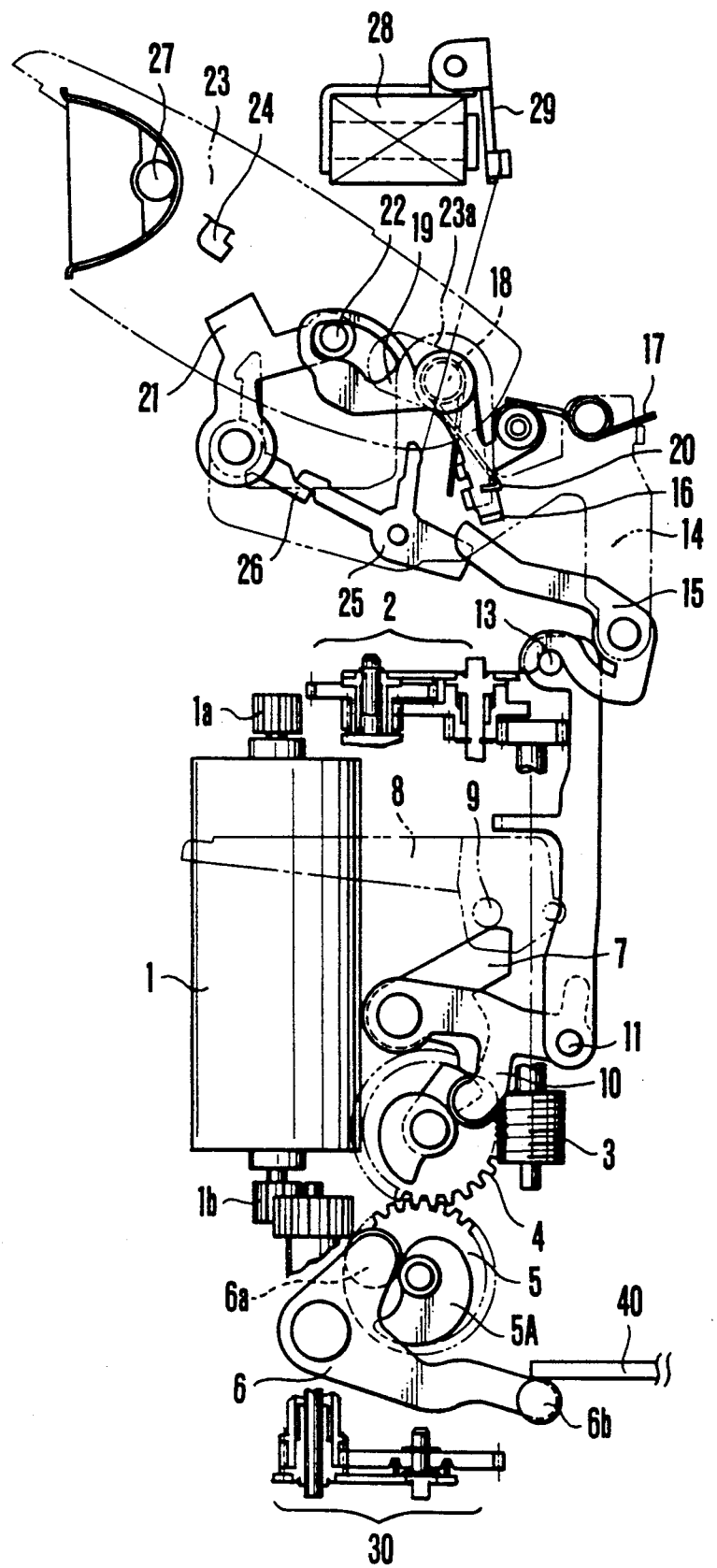
FIG. 3 shows it as in a state of having completed a mirror rising action.

When the shutter button is pushed further, the motor 1 comes to rotate forward. The forward rotation of the motor 1 causes the cam gear 4 to rotate clockwise through the pinion gear 1a, the gear transmission system 2 and the worm gear 3. An area 4A-a of the cam 4A which will be described later causes the lever 7 to turn counterclockwise. The dowel 9 which is secured to the mirror 8 is pushed up by the lever 7. The mirror 8 is thus turned clockwise from a viewfinder sighting position of FIG. 1 to an exposure allowing retracted position of FIG. 3. Then, in response to a phase signal which is not shown, a current supply to the motor 1 is cut off to terminate the mirror raising process at the maximum lift area 4A-b of the cam 4A.

Further, the cam gear 5 which engages the cam gear 4 is rotated counterclockwise. The roller part 6a of the lever 6 is rotated clockwise by the area 5-a of the cam 5A of the cam gear 5. This rotation is brought to a stop by the minimum lift area 5-b of the cam 5A.

In response to a mirror raising completion signal, a current is supplied to the shutter which is not shown. After completion of a travel of the leading curtain of the shutter, the light emitting part 27 of the flash device is allowed to flash. In response to a trailing curtain travel completion signal, the motor 1 is again allowed to make its forward rotation. The cam gear 4 is then caused via the gear transmission system 2 and the worm gear 3 to rotate further clockwise. The lever 7 then traces an area 4A-c of the cam 4A. The force of a spring which is not shown then pushes the mirror 8 down. The descent of the mirror 8 comes to an end at an area 4A-d of the cam 4A as will be described later.

The counterclockwise rotation of the cam gear 5 causes the roller part 6a of the lever 6 to trace the area 5-c of the cam 5A almost concurrently with the beginning of the descent of the mirror 8. The lever 6 proceeds to turn counterclockwise. The roller part 6b of the lever 6 pulls a shutter charge lever 40 upward which is included in a shutter unit. When the roller part 6a of the lever 6 comes to the area 5-d of the cam 5A, the current supplied to the motor 1 is cut off to bring the shutter charging action to an end.

Further, the rotation of the cam gear 4 causes the roller part 10a of the link 10 to trace the area 4B-a of the cam 4B almost concurrently with the beginning of the shutter charging action. The link 10 is turned counterclockwise according to the lift of the cam area 4B-a. Then, the link 12 which is rotatably carried by the pin 11 which is secured to the fore end of the link 10 is pushed up. The dowel 13 which is provided at the fore end of the link 12 causes the lever 15 to turn clockwise. A part 15a of the lever 15 then turns the lever 16 counterclockwise against the force of a spring 17. As a result, the lever 19 which is urged toward the lever 16 by the spring 20 turns counterclockwise along with the lever 16.

Figure 4:
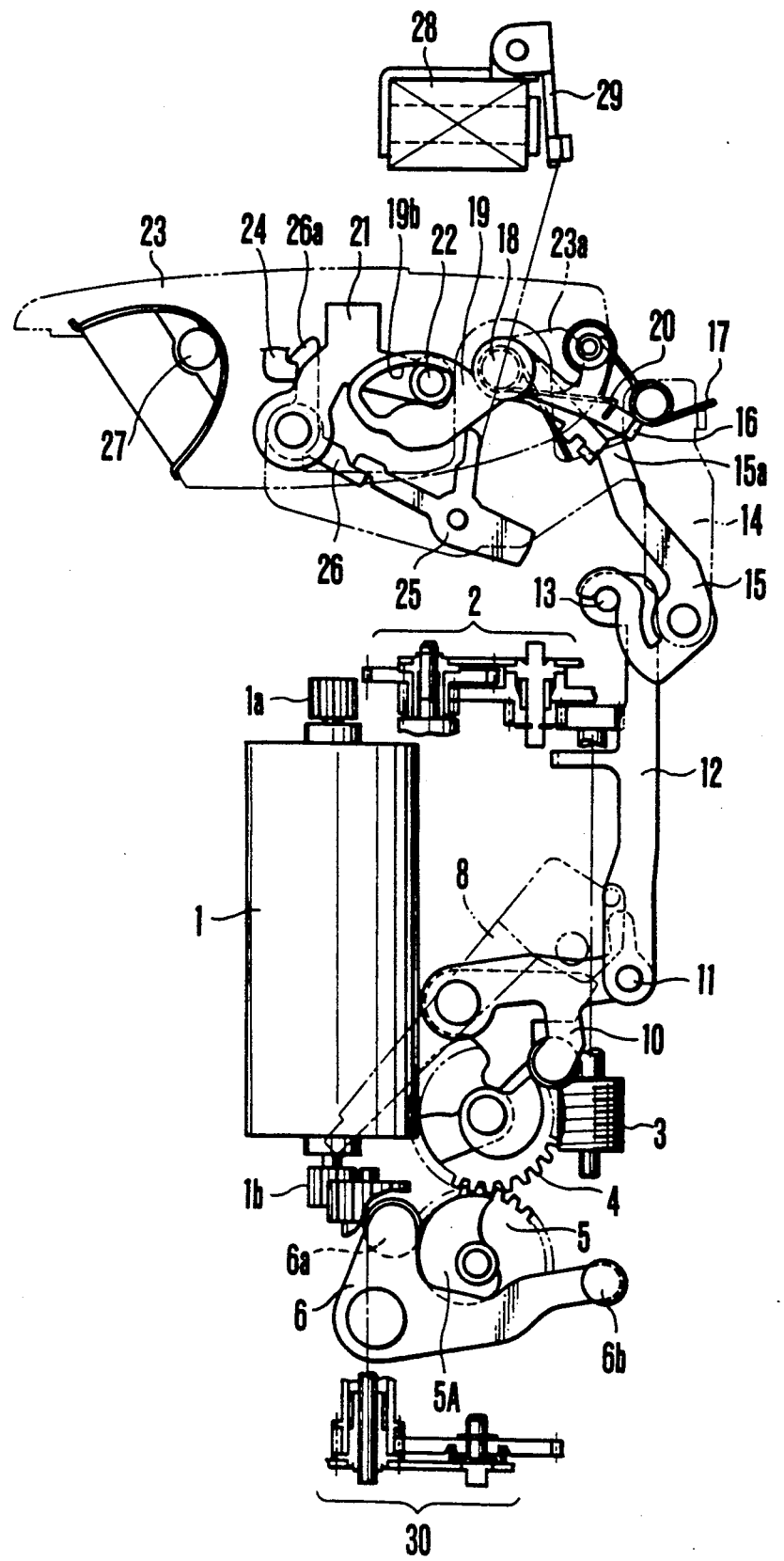
FIG. 4 shows it as in a state of having completed a flash device charging action.

The link 21 is caused to begin to turn clockwise by the roller 22 which is within the cam hole 19b of the lever 19. The casing 23 which is carried by the roller 22 moves downward in the direction of having the shaft 18 abut on the left side face of the slot 23a. Then, as shown in FIG. 4, at the maximum lift of the area 4B-a of the cam 4B, the fore end part 26a of the clamp lever 26 engages the hook 24 secured to the casing 23. This terminates the flash device descending action, i.e., a flash device charging action. Further, at the minimum lift part of the cam area 4B-b, the links 10 and 12 and the lever 15 stop to turn in a state of having no load.

Figure 5A:
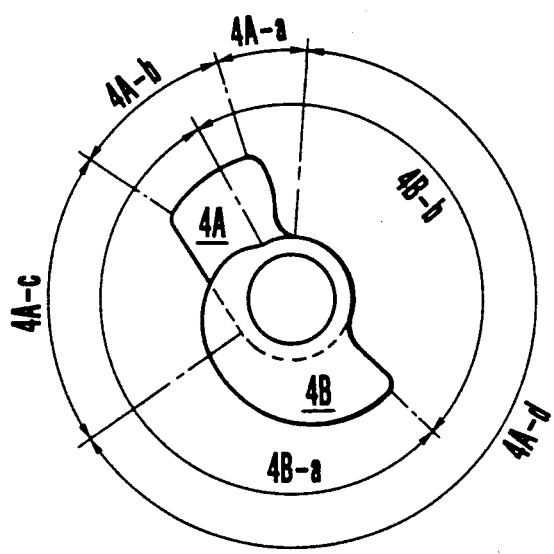
FIGS. 5(a) and 5(b) show the phases of cams used for the above-stated actions.
Figure 5B:
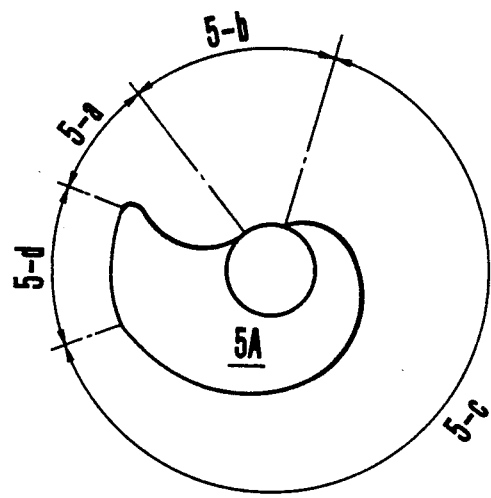

FIGS. 5(a) and 5(b) show the phases of the cam gears 4 and 5. Referring to these figures, the cam 4A which is provided for driving the mirror has an area 4A-a which is a mirror raising phase; an area 4A-b which is a phase for keeping the mirror 8 in its raised position; an area 4A-c which is a mirror descending phase; and an area 4A-d which is a phase for having the mirror in its descended position. The cam 4B which is provided for descending the flash device includes an area 4B-a which is a phase for the flash device descending (or charging) action; and another area 4B-b which is an idling area.

The cam 5A which is provided for charging the shutter includes: An area 5-a which is a phase for canceling a shutter charging load; an area 5-b which is an idling area; an area 5-c which is a phase for charging the shutter; and an area 5-d which is a phase for keeping the shutter in a charged state.

Figure 6:
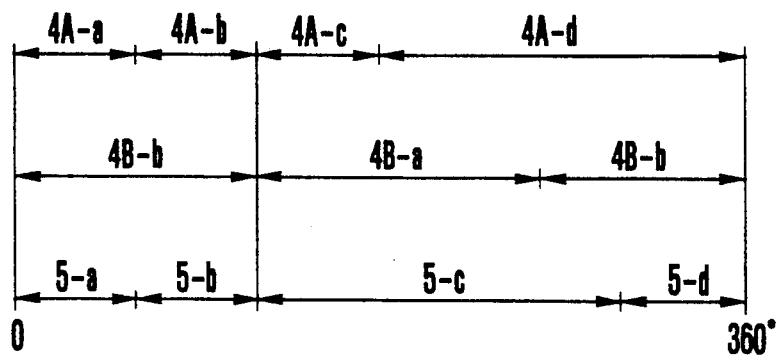
FIG. 6 shows the phasic relation of three cams.

FIG. 6 shows the phasic relation obtained among the three cams 4A, 4B and 5A. They are arranged to have the flash device charging action completed before completion of the shutter charging action.

After completion of the shutter charging action, the motor 1 is reversely rotated to terminate a photographing operation by winding the film through the pinion gear 1b and the gear transmission system 30.

Further, the links 10 and 12 and the lever 15 are arranged to act in association with the cam 4B even when a photographing operation is performed without popping up the flash device. In this instance, however, the subsequent loads including the lever 16 are not imposed, so that the photographing operation can be adequately carried out. Even if the popped-up flash device is intentionally pushed down by force from the outside, there arises no problem as the springs 17 and 20 serve to absorb the impact inflicted.

The embodiment described uses the attraction type magnet on account of its low cost. However. the attraction type magnet may be replaced with a release type magnet using a permanent magnet or with any actuator that is capable of canceling a clamped state, such as an actuator using a shape-memory alloy, bimorphous material. The link arrangement employed for the embodiment also may be differently arranged as long as it gives a pop-up mechanism capable of popping up the flash device with a spring force and popping it down while charging the spring. Further, in the case of the embodiment described, the flash device popping-up action is arranged to be performed according to the result of light measurement. However, in addition to that, the embodiment can be arranged to cause the flash device to flash every time the camera is under a dark condition in response to a manual operation on a switch other than a switch provided for detection of a back-lighting condition.

As described in the foregoing, the embodiment of this invention performs the flash device popping up action by means of a spring which exerts an urging force in the direction of raising the flash device in combination with a magnet which is arranged to release the flash device from its retracted position to which it has been locked. This arrangement enables the embodiment to pop up the flash device any time as desired irrespectively of other mechanisms of the camera. Further, the flash device descending mechanism is arranged to operate in association with the shutter charging mechanism. This permits simplification of the flash device descending mechanism by arranging it to include only the cams and the links. Further, since the flash device descending action is arranged to come to an end before the shutter charging action, a control over a motor stopping action can be accomplished simply by detecting completion of the shutter charging action irrespectively of the presence or absence of a flash device descending load. In other words, the shutter charging action can be accomplished without any additional control over the flash device descending action. Further, in accordance with the arrangement of this embodiment, the flash device can be clamped or locked in its retracted position when it is manually pushed down. Therefore, this eliminates the possibility of any inconvenience that might be caused by the automatic flash device descending action which is performed only in association with the shutter charging action after shutter release operation.

Further, while the flash device is disposed within the camera body in the case of the embodiment, the flash device may be arranged in accordance with this invention to be mounted and dismounted on and from the camera body. Such a modification can be made within the scope of the invention as defined in the appended claims.

We claim:

1. A camera comprising:
   (a) a flash device arranged to be movable between a pop-up position and a retracted position;
   (b) a first moving mechanism for moving said flash device from said retracted position to said pop-up position;
   (c) a charging mechanism for charging a shutter to bring said shutter from a state of having completed photographing into a state of being ready for photographing; and
   (d) a second moving mechanism for moving said flash device from said pop-up position to said retracted position, said second moving mechanism being arranged to move said flash device from said pop-up position to said retracted position in association with a charging action of said charging mechanism, wherein an action of said second moving mechanism to move said flash device to said retracted position is arranged to be completed prior to completion of the charging action of said charging mechanism.

2. A camera according to claim 1, wherein said charging mechanism includes a first cam which is arranged to be rotated by said motor, said shutter being arranged to be charged by a movement of a first cam follower caused by a rotation of said first cam, and wherein said second moving mechanism includes a second cam which is arranged to be rotated by said motor, said flash device being arranged to be moved by a movement of a second cam follower caused by a rotation of said second cam.

3. A camera according to claim 2, wherein said first cam is formed on a first rotary wheel which has a gear portion formed on the periphery thereof, wherein said second cam is formed on a second rotary wheel which has a gear portion on the periphery thereof, and wherein said first and second rotary wheels engage each other.

4. A camera according to claim 2, wherein a cam displacement of said first cam and that of said second cam are arranged in such a manner that an action of said second moving mechanism to move said flash device to said retracted position is completed prior to completion of the charging action of said charging mechanism.

5. A moving device for moving a flash device incorporated in a camera; comprising:
   (a) a first moving mechanism for moving said flash device from a retracted position to a pop-up position; and
   (b) a second moving mechanism for moving said flash device from said pop-up position to said retracted position, said second moving mechanism being arranged to move said flash device from said pop-up position to said retracted position in association with a charging action for charging a shutter, wherein an action of said second moving mechanism to move said flash device to said retracted position is arranged to be completed prior to completion of said charging action.

* * * * *

UNITED STATES PATENT AND TRADEMARK OFFICE
CERTIFICATE OF CORRECTION

PATENT NO. : 5,012,269
DATED : April 30, 1991
INVENTOR(S) : Yoichi Tosaka, et al.

It is certified that error appears in the above-identified patent and that said Letters Patent is hereby corrected as shown below:

COLUMN 4:

Line 63, "However." should read --However,--.

COLUMN 5:

Line 21, "irrespectively" should read --irrespective--.

Line 32, "irrespectively" should read --irrespective--.

COLUMN 6:

Line 42, "camera;" should read --camera--.

Line 52, "an" should read --any--.

Signed and Sealed this

Twenty-seventh Day of October, 1992

*Attest:*

DOUGLAS B. COMER

*Attesting Officer*     *Acting Commissioner of Patents and Trademarks*